United States Patent [19]
Dunfee et al.

[11] Patent Number: 5,660,771
[45] Date of Patent: Aug. 26, 1997

[54] MOLDING PROCESS FOR FORMING A SEALING GASKET ON FILTER MEDIA

[75] Inventors: William F. Dunfee, Denver; Ronald Ray Puckett; Edward Allen Covington, both of Gastonia, all of N.C.

[73] Assignee: Dana Corporation, Toledo, Ohio

[21] Appl. No.: 564,012

[22] Filed: Nov. 29, 1995

[51] Int. Cl.$^6$ .................. B29C 44/06; B29C 44/12
[52] U.S. Cl. .................. 264/46.4; 264/46.9; 264/252; 264/276; 264/DIG. 48; 425/812
[58] Field of Search ................. 264/46.4, 252, 264/276, DIG. 48, 46.9; 425/812

[56] References Cited

U.S. PATENT DOCUMENTS

| | | |
|---|---|---|
| 3,004,298 | 10/1961 | Haynie . |
| 3,124,630 | 3/1964 | Ronning et al. ............... 264/276 |
| 3,183,285 | 5/1965 | Boylan ............... 264/46.7 |
| 3,276,114 | 10/1966 | Blaurock . |
| 3,276,115 | 10/1966 | Hansz . |
| 4,957,672 | 9/1990 | Carter et al. ............... 264/46.4 |
| 5,030,263 | 7/1991 | Kemp ............... 264/252 |
| 5,071,605 | 12/1991 | Kawaguchi et al. ............... 264/276 |
| 5,114,639 | 5/1992 | Kurz et al. ............... 264/276 |
| 5,202,069 | 4/1993 | Pontiff . |
| 5,308,559 | 5/1994 | Baracchi et al. ............... 264/46.4 |
| 5,344,603 | 9/1994 | Jardin et al. ............... 264/252 |
| 5,356,580 | 10/1994 | Clark et al. . |
| 5,443,723 | 8/1995 | Stankowski et al. ............... 264/DIG. 48 |
| 5,529,476 | 6/1996 | Borasio et al. ............... 264/46.4 |

*Primary Examiner*—Allan R. Kuhns
*Attorney, Agent, or Firm*—Millen, White, Zelano & Branigan, P.C.

[57] ABSTRACT

In order to prevent the formation of flash on a gasket used to seal a filter element when the filter element is mounted in a housing to filter a fluid, such as air for an internal combustion engine, a molding method and apparatus utilizes a pair of mold components which abut along a mold line and define a cavity for forming the gasket. As the expandable material expands to fill the cavity and form the gasket, a portion of the material adjacent the mold line is received in an annular groove in one of the mold components so that flash is not formed at the mold line. One of the mold components also has an upwardly sloping ramp surface so that air and gas move along the ramp surface as the material expands and does not become trapped in the cavity, thus avoiding defects and blemishes in the gasket due to trapped air bubbles.

12 Claims, 4 Drawing Sheets

MOLDING PROCESS FOR FORMING A SEALING GASKET ON FILTER MEDIA

FIELD OF THE INVENTION

The present invention relates to an improved molding process and apparatus. More particularly, the present invention relates to an improved molding process and apparatus for molding a gasket to a filter media.

BACKGROUND OF THE INVENTION

Cylindrical and conical filter elements used in filter assemblies for filtering fluids are frequently configured with a cylindrical or conical media in which fluid being filtered passes radially through the media either from, or to, a hollow central core which is plugged at one end. In order to appropriately mount the filter media, the filter media is frequently provided with a radially projecting, annular gasket for sealing the media with respect to inlet and outlet openings.

A conventional practice in forming the gasket is to expand within a mold cavity foamable material such as polyurethane produced by a mixture of polyol and isocyanate. When using this process, the expanding material produces flash between upper and lower mold halves. The flash must be trimmed and vacuumed off prior to sale of the filter element; otherwise, the flash may become dislodged during installation or operation. If the flash is sucked against the filter media, the media's efficiency is reduced. There is also the chance of loose flash being transferred into the engine or other machine on which the filter employing the media is installed and meant to protect.

Another difficulty which arises when forming such annular seals is the occurrence of pits or other discontinuities in the surface of the gasket due to air or other gas bubbles being trapped as the material from which the gasket is formed expands into engagement with the surface of the top mold. In addition to presenting an unfinished appearance, these defects can on occasion result in a leaking seal which can allow at least small debris to be sucked around the gasket into the engine. In addition, the strength of the gasket may be compromised if large air bubbles are trapped in the foam material as it expands.

SUMMARY OF THE INVENTION

Upon further study of the specification and appended claims, further features and advantages of this invention will become apparent to those skilled in the art.

In view of the aforementioned considerations, it is a feature of the present invention to provide a new and improved method of forming a sealing gasket on a filter media by molding expandable material in an annular, radially extending cavity defined by first and second molds positioned around the filter media and joined to one another along a mold line. As the material expands, a portion of the material is accumulated in a space which is proximate, but axially displaced from the mold line, to accumulate a material which would otherwise extrude between the first and second molds and form undesirable flashing which must subsequently be trimmed.

In another aspect, the invention includes venting the cavity through the filter media as the gasket forming material expands in a way that air and gas in the cavity does not become trapped in the media and form blemishes and discontinuities therein. The effectiveness of the venting step is enhanced by providing the second mold with an upwardly sloping annular ramp adjacent to the location of the filter media which provides a surface as long which the air and gas travels before venting through the filter media.

In still a further aspect of the invention, the material for forming the sealing gasket is open foam polyurethane formed by mixing polyol and isocyanate.

The aforedescribed method is accomplished using an apparatus comprising first and second molds wherein the first mold includes an annular plug portion and radially extending plate portion, the radially extending plate portion having an axially extending peripheral wall and an axially extending annular rib for supporting an annular filter media in spaced relation to the annular plate portion and in coaxial relation with the annular plug. A second mold cooperates with the first mold by enclosing the exterior surface of the filter media and cooperating with the peripheral wall on the radially extending plate to provide an annular cavity between a first surface on the annular plate portion of the first mold and a second surface on the radially extending portion of the second mold. The radially extending portion of the second mold engages the peripheral rib of the first mold along a mold line and has an annular groove adjacent the mold line to accumulate excess material, so that the material does not extrude through the mold line to form flashing, which must subsequently be trimmed.

In accordance with a further aspect of the invention, the second surface which is on the radial portion of the second mold, has an annular ramp extending in a positive direction with respect to the axis of the mold apparatus to provide a surface which assists in conveying air from the cavity and through the filter media as the material expands within the cavity to form the gasket.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
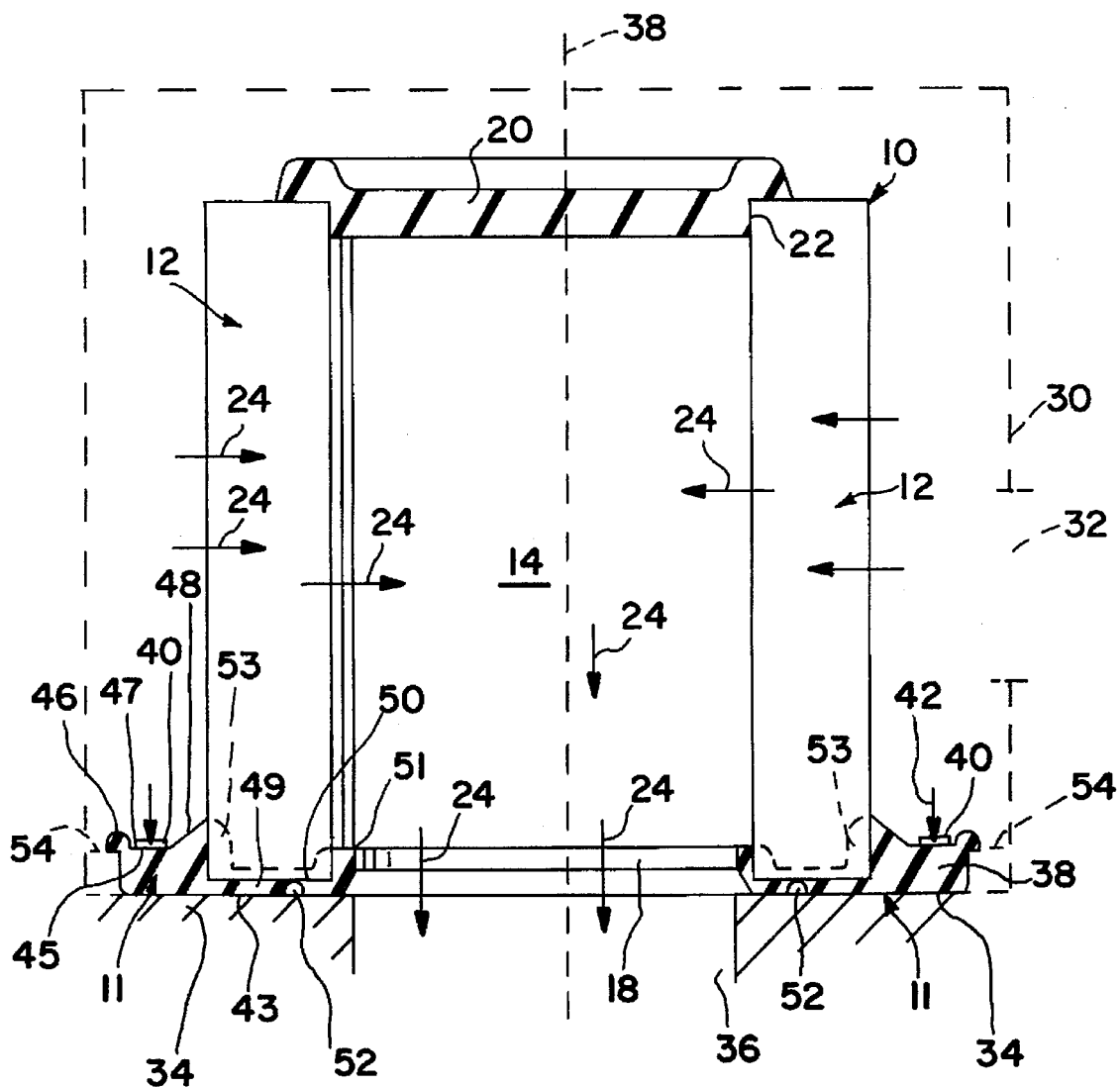
FIG. 1 is a side elevation of an air filter element having a gasket formed in accordance with the principles of the present invention, shown in a filter housing clamped to a base around an air inlet of an internal combustion engine.

Referring now to FIG. 1, there is shown a filter assembly 10 having a sealing gasket 11 fabricated in accordance with the method of FIGS. 2-6. In the illustrated embodiment, the filter assembly 10 has an annular filter media 12 which is cylindrical; however, the filter media 12 may have other shapes. For example, the filter media 12 may be configured as a frustom rather than a cylinder.

The filter media 12 has a hollow core 14 which is open at a first end 18 and is plugged with an endcap 20 at a second end 22. In the illustrated embodiment, the filter element 10 filters a fluid which flows radially through the filter media 12 in the direction of arrows 24 into the hollow core 14. Typically, the filter media 12 traps particles entrained in the fluid stream on the filter media and the cleaned fluid flows out of the filter assembly 10 through the first open end 18 of the filter assembly. In the illustrated embodiment, the fluid being filtered flows radially inwardly; however, in some arrangements, the fluid flows outwardly. While in the illustrated embodiment the fluid being filtered is air, the invention has relevance to filters filtering other gases or liquids. For example, the fluid being filtered may be lubricating oil or hydraulic fluid.

Generally, the filter element 10 is mounted in a housing schematically illustrated by the dotted lines 30 which has an opening at some appropriate location schematically illustrated by the dotted lines 32. The housing has a base 34 surrounding an air inlet 36 of, for example, an internal combustion engine (not shown), which air inlet is coaxial with the axis 38 of the filter assembly. The gasket 11 is clamped against the base 34 by a clamp 40 which, in some known matter, applies a force 42 in the axial direction of axis 38 to push the first surface 43 of the gasket 11 against the base 34 by applying pressure to a sealing area 45 of the gasket. The clamp may be in the form of a flange on the housing 30 which abuts the sealing area 45 of the gasket. The gasket 11 has an annular bead 46 which projects from the top surface 47 thereof and a frustoconical portion 48 which slopes positively with respect to the axis 38 from the sealing surface 47. In addition, the gasket 11 has a thin portion 49 which extends inwardly between a radial end surface 50 of the filter media 12 and an internal annular portion 51 which extends a short distance into the hollow core 14 of the filter media. An annular groove 52 is formed in the thin layer 49, and if the filter media 12 is formed in pleats, an embedded annular portion 53 of the gasket 11 is disposed between the pleats of the filter media.

It is important that the gasket 11 not have large gas bubbles therein, and it is especially important that the sealing surface 45 be free of blemishes which might compromise the integrity of the seal formed by the clamp 40. It is also important that when the gasket 11 is sold or used that flashing, illustrated by the dotted line 54, not be present because the flashing can become dislodged and impinged against the filter media 12 or even find its way during handling, shipping or installing to the opening 18 of the filter element where it can enter the machinery being protected and possibly cause damage. Prior to the instant invention, the flashing 54 was trimmed and then vacuumed away to avoid these hazards. With the present invention, no flashing 54 occurs.

Figure 2:
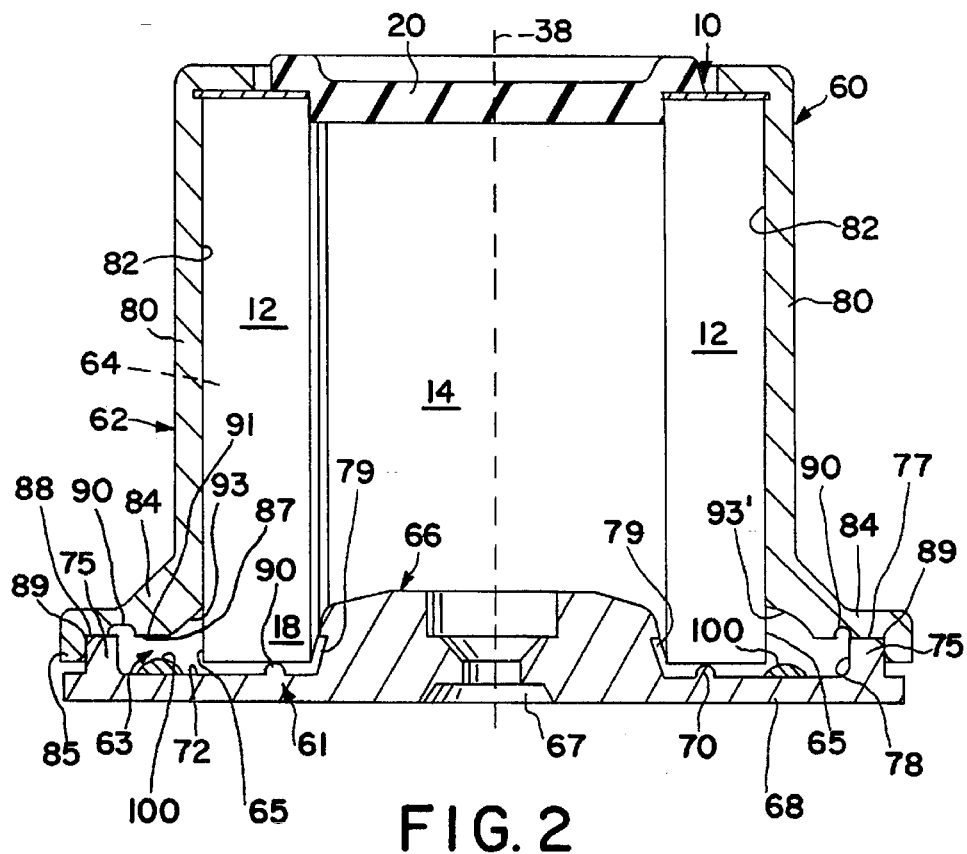
FIG. 2 is a side elevation showing the filter element of FIG. 1 positioned within a mold for forming the gasket of FIG. 1.

Referring now to FIGS. 2–6, there is shown molding apparatus 60 for practicing the method of the present invention. As is seen in FIG. 2, the filter assembly 10 without the gasket 11 (see FIG. 1) is placed in the molding apparatus 60 so that the gasket may be molded around the filter media. The mold 60 is comprised of a first mold component 61 and a second mold component 62. The first and second mold components 61 and 62 cooperate to form an annular cavity 63 which extends radially with respect to a substantially cylindrical chamber 64 in the first mold, the cylindrical cavity 64 being configured to conform to the shape of the filter media 12. Aligned with the cavity 63 is an exposed portion 65 of the filter media 12, against which exposed portion the gasket 12 abuts.

The first mold component 61 has an annular plug 66 with an axial opening 67 therethrough and a circular plate portion 68 which is coaxial with the annular plug portion about the axis 38 of the filter assembly 10 mounted therein. The first mold 61 also includes an annular rib 70 which extends upwardly from a first molding surface 72 thereof so as to hold the filter media 12 spaced from the first surface 72. It is the annular rib 70 which forms the annular groove 52 in the gasket 11 (see FIG. 1). The first mold 61 also includes a peripheral wall 75 which extends upwardly from the first surface 72, the peripheral wall 75 having a top surface 77 thereof, adjacent an inner annular wall 78 thereof. The first surface 72 of the plate 61 communicates with a generally axially extending annular groove 79 in the plug 66, which axially extending annular groove 79 faces the wall of the hollow core 14 of the filter element 12 to define an inner annular space.

The second mold component 62 has a cylindrical barrel portion 80 with an inner surface 82 which conforms to the shape of the filter media 12. If the filter media 12 is cylindrical, then the wall 82 is cylindrical and if the filter media 12 is frustoconical, then the wall 82 may also be frustoconical. A radial flange 84 extends outwardly from the barrel 80 and has an annular lip 85 which fits over the peripheral wall 75 of the first mold member 61. Projecting radially inwardly from the annular lip 85 is a second molding surface 87 which has an outer area 88 which abuts with the upper surface 77 of the peripheral wall 75 to form an area referred to in the art as a "mold line" 89. Just inboard of the mold line 89 is an annular groove 90. Extending inwardly from the annular groove 90 is a flat radial surface 91 which molds the clamping surface 45 on the gasket 11 (see FIG. 1). Sloping upwardly (or in a positive direction with respect to the axis 38 and the surface 72 of circular plate 68) is a frustoconical ramp surface 93. The frustoconical ramp surface 93 has the same shape and slope through 360°. That shape may vary for different types of seals and may have, a substantially flat surface as seen on the left-hand side of FIGS. 2–6 or a concave surface as is seen by the ramp 93' on the right-hand sides of FIGS. 2–6. The ramp may also have a convex surface (not shown).

In order to form the gasket 11, a quantity of open pour polyurethane 100 is deposited on the surface 72 of plate portion 68 of the first mold 61. Open pour polyurethane is a mixture of polyol and isocyanate which combine in an exerthermic process to produce polyurethane foam. During the reaction, carbon dioxide is released as the mixture reacts and expands.

Figure 3:
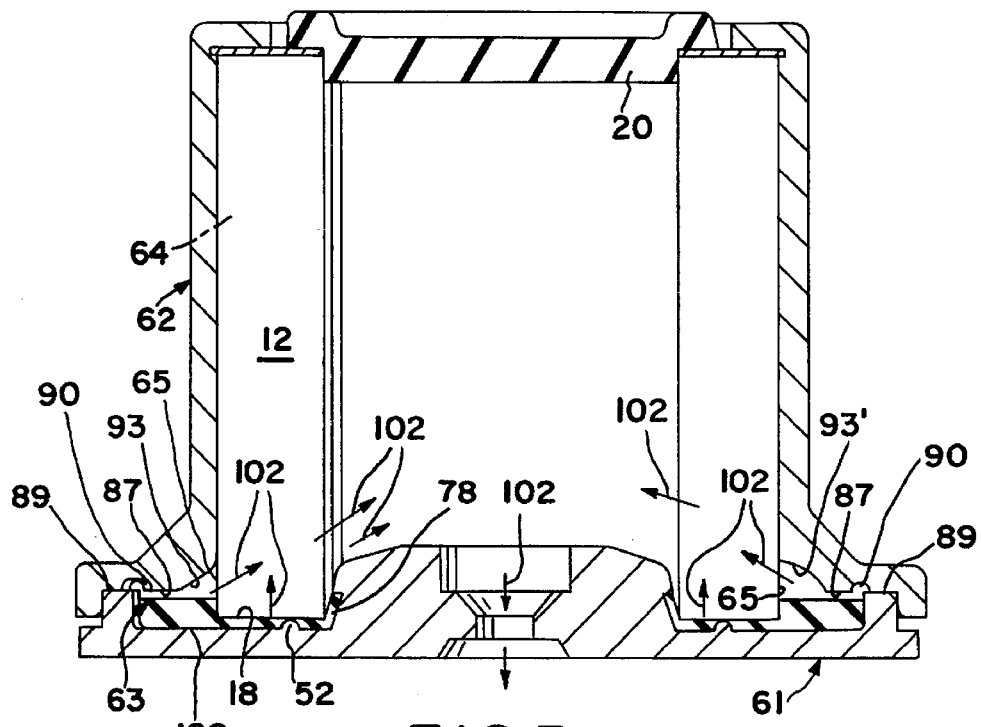
FIG. 3 is a view similar to FIG. 2 showing urethane material starting to expand to form the gasket of FIG. 1.
Figure 4:
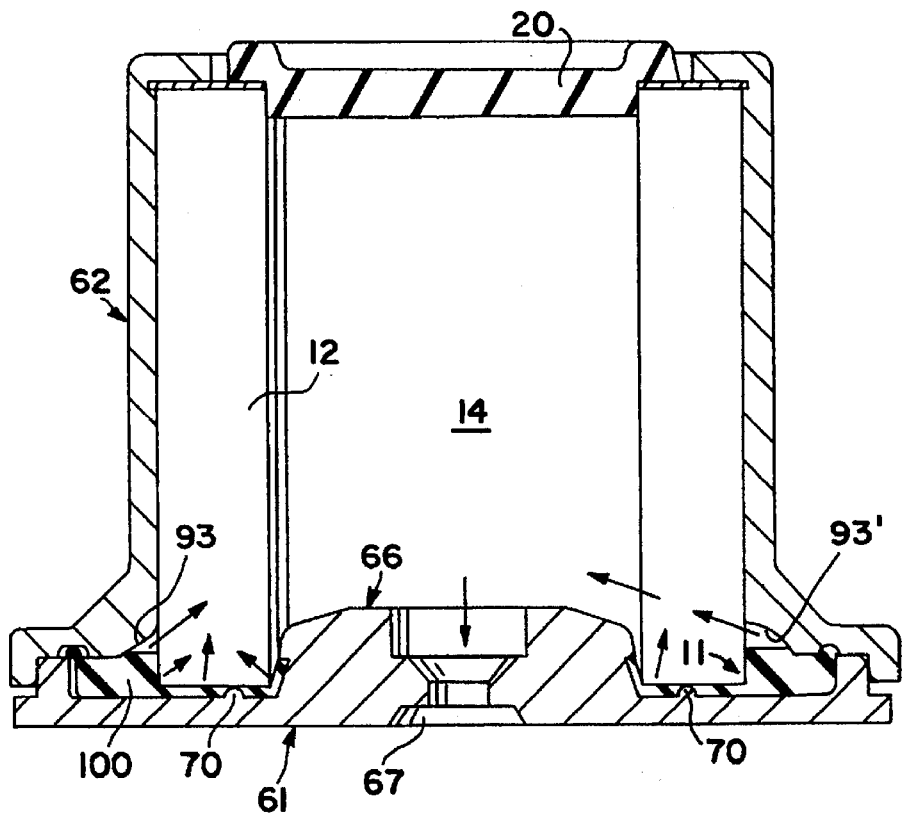
FIG. 4 is a view similar to FIGS. 2 and 3 showing the urethane material toward the end of its expansion.

As the polyol and isocyanate charge 100 expands to form foamed polyurethane, pressure in the cabinet 63 rises both because carbon dioxide is generated and air in the cavity is compressed. The carbon dioxide and air are expelled in the direction of arrows 102 (FIGS. 3 and 4). Some of the air and gas pass radially through the filter media 12 to hollow core 14 while other air and gas pass initially axially into the filter media and then pass radially to the hollow core. The hollow core 14 is open at first end 18 so that during the molding process the air and gas pass through the central hole 67 in the plug portion 66 of the first mold component 61. As is seen in FIGS. 3 and 4, as the polyol and isocyanate react, the cavity 63 is filled with gas and air which moves up the annular ramp 93. By providing the annular ramp 93, chances are minimized that air or gas will become trapped between the flat radial surface 91 of the first mold 62 and the clamping surface 47 of the molded gasket 11. Thus, chances are minimized that the clamping surface 47 of the gasket will have imperfections or blemishes therein.

Since the first end 18 of the filter media 12 is displaced by the annular rib 70 from the surface 72 of the plate 68, a thin space is formed which is filled by the expanding foam material to form the thin radical portion 48 of the gasket 11. The expanding mixture 100 also fills the axially extending annular groove 79 in the plug 66 to form in the annular space defined by the groove, the internal annular portion 51 of the gasket 11 (see FIG. 1).

In order to prevent flashing (dotted lines 54, FIG. 1) from forming at the mold line 89, while still allowing the gasket 11 to expand radially a sufficient distance to form the clamping surface 47 on gasket, the polyurethane foam formed by the expanding mixture 100 flows into the annular groove 90 formed in the surface 87 of the second molding component 62. The polyurethane which accumulates in the annular groove 90 forms the annular bead 46 of FIG. 1 which does not need to be trimmed from the gasket 11. As is seen in FIG. 2, the annular groove 90 has sufficient volume to accomodate the bead 46 and residual gas and air remaining after the expansion of the mixture 100 has occurred. Because of the annular groove 90, no peripheral flash 54 (see FIG. 1) is formed on the gasket 11, so there is no need to employ an operator to trim the flash and vacuum it away.

Figure 5:
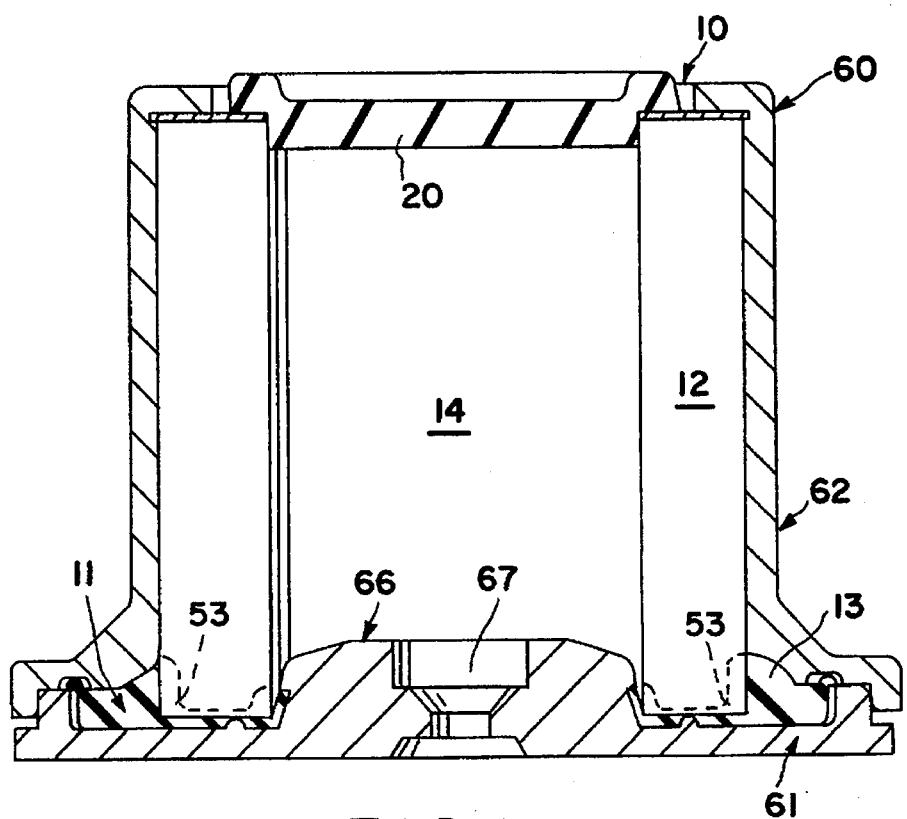
FIG. 5 is a view similar to FIGS. 2-4 showing the urethane material expanded completely to form gasket prior to removing the filter element from the mold.
Figure 6:
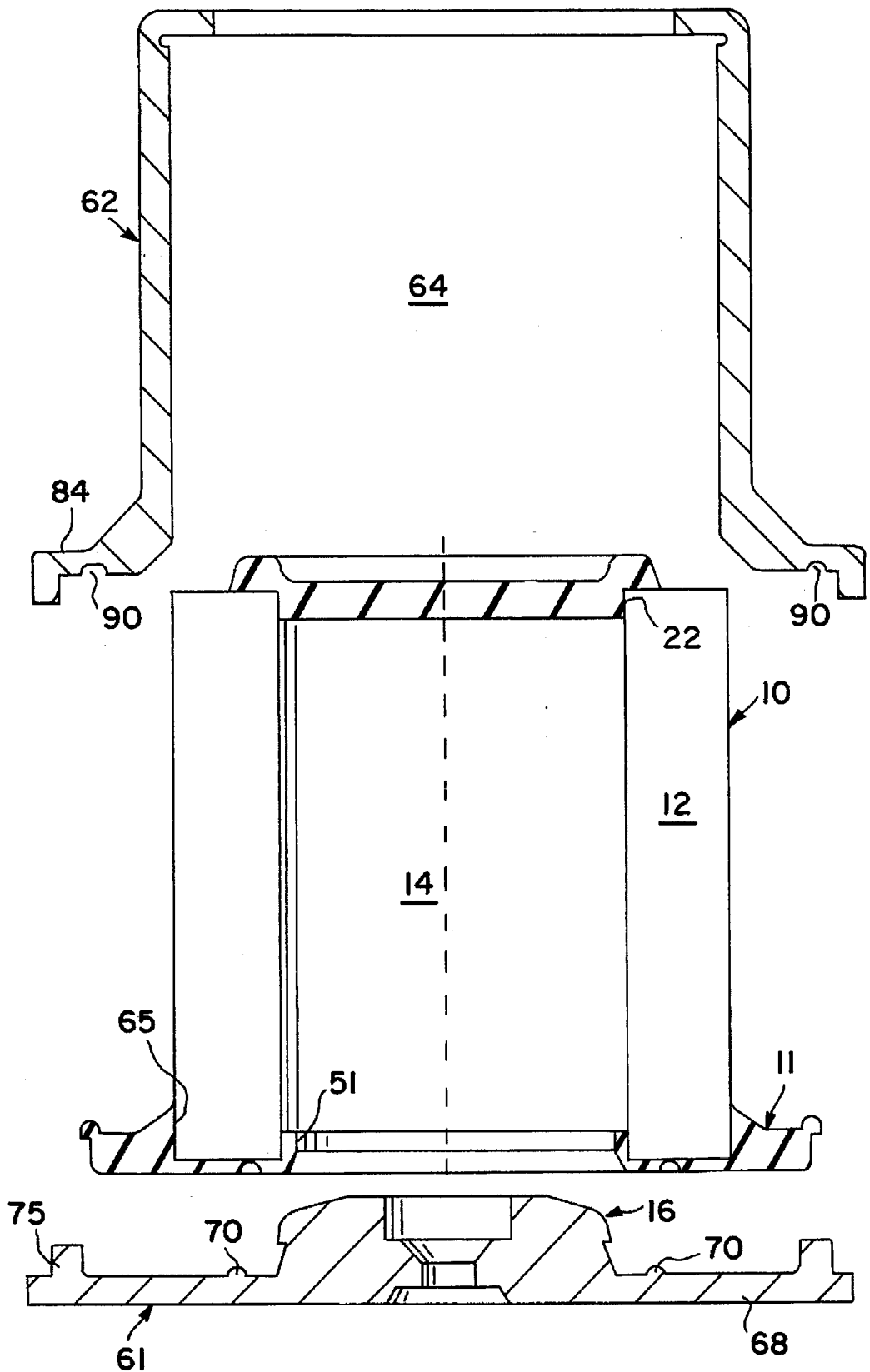
FIG. 6 is an exploded side elevation showing the completed filter element being separated from the mold.

As is seen in FIG. 5, complete gasket 11 is fully formed on the filter media 12 while the filter assembly 10 is within the molding apparatus 60. As is seen in FIG. 6, when the first and second components 61 and 62 are separated from one another, a filter element 10 is provided which has a gasket 11 having no peripheral flash.

It is emphasized that while the aforedescribed method and apparatus are used to produce air filter elements 10 for internal combustion engines, the concepts disclosed herein may be used for other types of filters which have gaskets, the quality of which is diminished by mold line flashing and surface blemishes and defects due to air and gas trapped during molding.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of forming a sealing gasket on a filter media by molding expandable foam material about the filter media in a laterally extending cavity defined by first and second molds positioned around the filter media and joining one another along a mold line, the improvement comprising:

expanding a portion of the material away from the mold line into a space located proximate, but axially displaced from, the mold line to form a peripheral bead and prevent formation of flashing at the mold line, and venting the cavity through the filter media as the material expands.

2. The method of claim 1, wherein the sealing gasket and filter media are annular.

3. The method of claim 1, wherein the second mold includes a surface facing the first mold, the surface being configured as a ramp sloping in a positive direction wherein as the material expands, gas in the cavity moves along the annular ramp and then vents through the filter media.

4. The method of claim 3, wherein the expandable material is open pour polyurethane formed by mixing polyol and isocyanate.

5. In a method of molding a gasket on a filter media formed about an axis and having a hollow core, wherein the filter media has an axially extending outer surface, and an axially extending inner surface connected by a radially extending surface, and wherein the gasket is formed by expanding a foam material into a cavity surrounding the outer surface of the filter media, the improvement comprising:

positioning the filter media proximate a first mold, which first mold has a circular plate portion disposed in spaced relation to the radially extending surface of the filter media and extends perpendicular to the axis of the filter media, the first mold further having a plug which axially extends partially into the hollow core of the filter media in spaced relation to the inner surface of the filter media to define an inner space;

surrounding the filter element with a second mold having a portion for engagement with the outer surface of the filter media with the exception of an exposed portion of the outer surface of the filter media disposed proximate the radially extending surface; the second mold engaging the first mold along a mold line disposed in radial spaced relation to the filter media;

defining a radially extending cavity with first and second molds, the radially extending cavity extending outboard of the exposed portion of the outer surface of the filter media, the radially extending cavity being in communication with a shallow space between the plate of the first mold and the radially extending surface of the filter element;

expanding the foam material in the radially extending cavity to advance against the exposed portion of the outer surface of the filter element and through the shallow space between the filter media and the first mold; and accumulating a portion of the expandable material in a groove formed in the second mold proximate the mold line to prevent the formation of flash on the gasket at the mold line.

6. The method of claim 5 further including the step of venting the cavity through the filter media.

7. The method of claim 6, wherein venting is accomplished by providing the second mold with a ramp oriented obliquely with respect to the axis of the filter media and sloping in a positive direction toward the axis.

8. The method of claim 5, wherein the expandable material is open pour polyurethane formed by mixing polyol and an isocyanate.

9. The method of claim 5, wherein the gasket and filter media are annular.

10. A method of forming a sealing gasket about an open end of an air filter media having a hollow core comprising:

molding expandable foam material about the open end of the air filter media in a laterally extending cavity defined by first and second molds positioned around at least the open end of the air filter media wherein the molds join one another along a mold line;

expanding a portion of the material away from the mold line into a space located proximate, but axially displaced from, the mold line to form a peripheral bead and to prevent formation of flashing at the mold line; and venting the cavity at a location displaced radially inward from the space.

11. The method of claim 10, wherein the second mold includes a surface facing the first mold, the surface being configured as a ramp sloping in a positive direction wherein as the material expands, gas in the cavity moves along the annular ramp and then vents through the filter media.

12. The method of claim 11, wherein the expandable material is open pour polyurethane formed by mixing polyol and isocyanate.

* * * * *